Aug. 18, 1931.  A. E. YOUNG  1,819,313
MEASURING APPARATUS
Filed Sept. 27, 1929
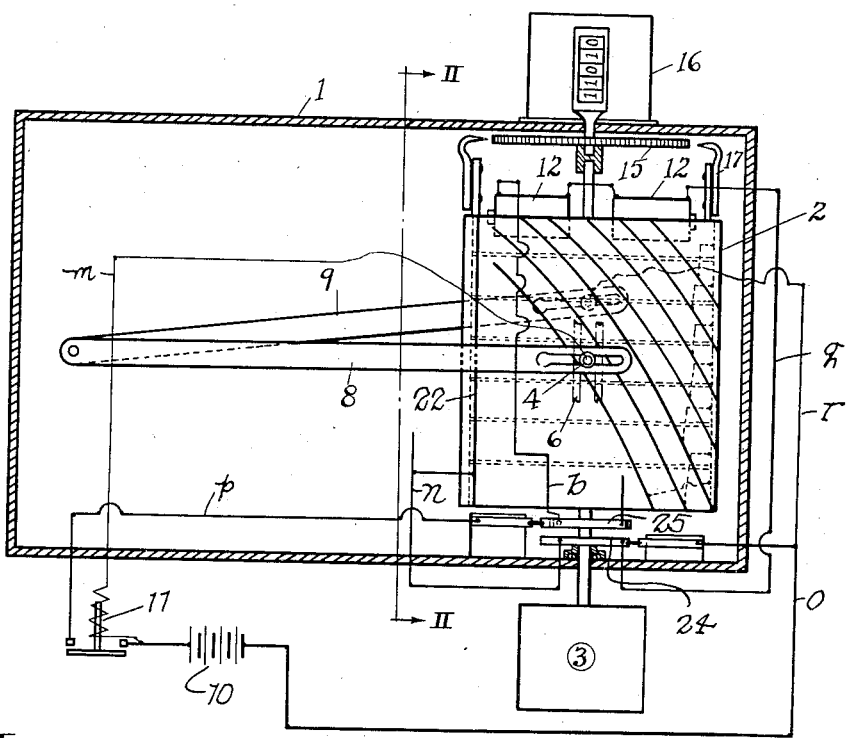
Fig. I.
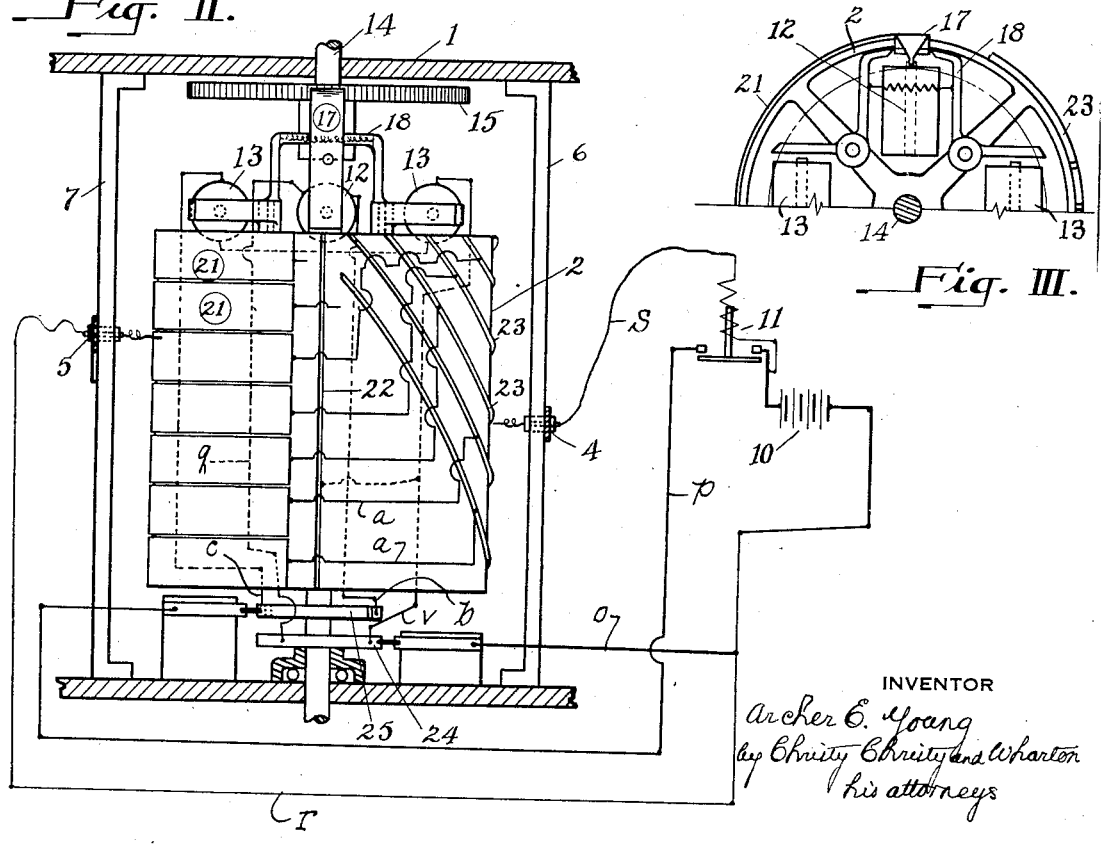
Fig. II.
Fig. III.
INVENTOR
Archer E. Young
by Christy Christy and Wharton
his attorneys Patented Aug. 18, 1931

1,819,313

UNITED STATES PATENT OFFICE

ARCHER E. YOUNG, OF PITTSBURGH, PENNSYLVANIA

MEASURING APPARATUS

Application filed September 27, 1929. Serial No. 395,694.

My invention relates to measuring apparatus, and consists in means for integrating two variables, and so affording during prolonged intervals of time the aggregate value of a quantity whose value at every particular instant is itself dependent upon the then existing values of two variable quantities. For example, the work formula for a gas compressor is $$W = 2.052\, p_1 \left[ \left( \frac{p_2}{p_1} \right)^{.21} - 1 \right]$$

in which W indicates work in horse-power for piston displacement of 100 cubic feet of gas per minute, with a ratio of specific heats at 1.27, $p_1$, the intake pressure in pounds per square inch of the gas as it enters the compressing cylinder, and $p_2$, the discharge pressure in pounds per square inch of the gas as it emerges from the compression cylinder.

Ordinarily, the values of $p_1$ and $p_2$ are severally recorded, and the value of W must then be calculated according to the formula. My invention lies in apparatus which shall afford record through prolonged intervals of time, not of $p_1$ nor of $p_2$ but of W.

I cite the particular case of the determination of the quantity of work performed by an air compressor as a typical case, in which the integration of two variables is involved. The invention is applicable to any situation in which through prolonged intervals of time the summation is desired of a quantity, the value of which at any particular moment is dependent upon and conditioned by the values at that moment of two variables. In other words, my apparatus will solve any equation which involves two variables.

By apparatus of my own invention, to which allusion will suffice, the summation through prolonged intervals of time of a quantity which at any particular moment is the product of two variables may be made. That is a special case in the general field of this invention. That special case will be found stated in my application for Letters Patent of the United States, filed August 1, 1929, Serial No. 382,692. By the apparatus of my present invention not only may the problem of the application alluded to be solved, but every problem of the summation of a quantity whose value at a given instant is dependent on the extant value of two variables, whether the equation be capable of simplification to the form of the product of two terms or not.

Referring to the drawings Fig. I is a view in horizontal section of an instrument which embodies my present invention, and Fig. II is a fragmentary view to larger scale and in vertical section, on the plane indicated by the broken line II—II, Fig. I. In both figures an electrical system is diagrammatically indicated. Fig. III is a fragmentary view showing in end elevation a rotary member which forms part of the organization.

Within a suitable case 1 a cylinder 2 is rotatably mounted, and clockwork, diagrammatically indicated at 3 causes the cylinder to rotate constantly at uniform speed. Two blocks 4 and 5 move in runways 6 and 7; these runways extend adjacent cylinder 2 and in parallelism with its face, and conveniently in diametrically opposite positions with respect to cylinder 2. The blocks 4 and 5 in their positions along the runways are severally responsive to the values of the two variables to be integrated. In illustration of the particular case cited above, the position of block 4 along its runway 6 may be understood to be responsive to $p_2$ of the formula, that is to say, responsive to the pressure of the air when compressed and as it escapes from the compressing cylinder; and the position of block 5 along its runway 7 may be understood to be responsive to $p_1$, that is to say, responsive to the pressure of the air as it enters the compressing cylinder. In Fig. I these two blocks are shown to be engaged by the slotted arms 8 and 9, which in known manner may be made to swing in response to variation in value of the two variables mentioned, and the arms 8 and 9, so swinging, determine the positions of the blocks in their runways. Each block carries in the form of a brush one terminal of an electric circuit, as is indicated in Fig. II.

The face of cylinder 2 is provided with two sets of contact pieces; one consisting of a succession of circumferential bands 21, the other consisting of a single longitudinally extending strip 22 and associated with it a plurality of obliquely extending strips 23. These two sets of contact pieces are provided with surfaces adapted for contact by the brushes which the two blocks 4 and 5 carry, but the contact surfaces of the two sets extend severally in conformity to cylindrical surfaces of different radii, and the brushes correspondingly are unequally remote from the axis of cylinder rotation. In consequence, cooperation is selective; during one half of a rotation of the cylinder the two brushes are in cooperative relation with the two sets of strips; during the other half of a rotation, one of the brushes is beyond the range of contact, and there is no cooperation. The obliquely extending strips 23 correspond in number to the bands 21; and, as is indicated at $a$, each strip 23 is electrically united with one of the bands 21.

The electrical system is diagrammatically shown. A suitable source of electrical energy is indicated at 10; a relay switch at 11. The shaft of cylinder 2 carries insulated upon it collector rings 24 and 25; the ring 24 is complete and continuous; ring 25 is composed of two arc-shaped parts, insulated one from the other; ring 24 is united, as indicated at $n$ (Fig. I), with strip 22; one arc of ring 25 is united, as indicated at $b$, in series with the coils of two electro-magnets 12 borne by cylinder 2, and the other arc is similarly, as indicated at $c$, united with the coils of electro-magnets 13. Upon the two collector rings brushes bear, as is indicated in Fig. II.

When in the course of rotation of cylinder 2 the brush borne by block 4 makes contact with strip 22 a circuit of relatively high resistance is closed from source 10 (cf. Fig. I) through the solenoid of switch 11, line wire $m$, contact piece 4, strip 22, line wire $n$, ring 24, and line wire $o$, to the source again. The relay switch 11 is thereupon closed, and a circuit of relatively low resistance from the same source 10 is then completed through line wire $p$, ring 25, lead $b$, electro-magnets 12, line wire $q$, ring 24, and line wire $o$, back to the source. When as cylinder rotation continues the brush borne by block 4 passes beyond contact with strip 22, the electro-magnets 12 are de-energized again. In the further turning of the cylinder 2 the brush 4 makes contact with the successive strips 23, 23, and when at length it reaches that strip 23 which is in electric union with the band 21 then engaged by the brush borne by block 5, a circuit first of high resistance is closed (cf. Fig. II) from source 10, through lead $r$, brush 5, strip 21, lead $a$, strip 23, brush 4, lead $s$, through the solenoid of switch 11, and back to the source. Immediately, by the closing of the relay switch 11 a circuit of low resistance is closed from source 10, through switch 11, lead $p$, ring 25, lead $c$, magnets 13, lead $v$, ring 24, lead $o$, to the source again. When the brush borne by block 4 passes beyond contact with the particular strip 23, the electro-magnets 13 immediately are de-energized.

Mounted co-axially with cylinder 2 upon a shaft 14 is a disk 15, and shaft 14 is the drive shaft of a tally 16. Cylinder 2 is equipped with means movable to and from locking engagement with disk 15, to the end that when and so long as such locking means are active disk 15 turns in unison with cylinder 2. Such means are found in arms 17 which extend longitudinally beyond the end of cylinder 2 and opposite the rim of disk 15. Two such arms are shown, arranged at diametrically opposite points in the circumference of the cylinder, and such number of arms, so arranged, is adequate. The arms at their tips and the disk on its perimeter are adapted for alternate interlock and release, and to that end the arms 17 are shown to terminate in radially extending tongues and the perimeter of the disk is indicated to be notched.

The arms 17 are resilient; normally they stand free of engagement with disk 15, in the positions shown in Fig. I; and from such positions they may be drawn inwardly to engagement with the disk; and pivoted and spring-backed latches 18 are provided which, when swung behind the inwardly drawn arms, hold the arms in engagement with the disk. The arms are formed, wholly or in part of magnetic material, and are in consequence responsive to the attractive power of electro-magnets 12. When electro-magnets 12 are energized the arms 17 are drawn inward, and at once the latches 18 closing behind them hold them in such in-drawn and disk-engaging position. When presently by the breaking of contact between the brush of block 4 and strip 22 the electro-magnets 12 are de-energized, the latches 18 continue still to hold arms 17 in engagement with disk 15. When, thereafter, the brush borne by block 4 engages that strip 23 which is in electric union with the band 21 then engaged by block 5, electro-magnets 13 are energized; and these when energized swing the latches 18 to unlocking position, allowing the arms 17 to resume normal position and releasing disk 15 from engagement by these arms. When thereafter contact with the particular strip 23 is broken, as immediately it is, the latches are released. The latches bearing laterally upon arms 17 may not then close, but when the arms 17 are again drawn inward the latches will close behind them, as already described.

So long as arms 17 engage disk 15 the tally will respond to disk rotation. When the arms swing outward and release the disk 15 the tally stops.

Returning now to the formula stated above, $$W = 2.052\ p_1\left[\left(\frac{p_2}{p_1}\right)^{.21} - 1\right]$$

it may be understood that block 5 in its movement along ways 7 is an expression of the value of $p_1$, and that block 4 in its movement along ways 6 is an expression of the value of $p_2$. Let it be assumed that the successive bands 21 from the lowermost upward correspond to pressures, in pounds, from atmospheric pressure upward, 15 pounds, 16, etc. (The increment of increase from strip to strip may be large or small, according to the necessities of the case.) For each band 21 there is, as has been said, a connected strip 23, and the strips 23 are severally so disposed upon cylinder 2 that, within the range of movement of block 4 the circumferential distance between strips 22 and 23 is the exact value of W in the foregoing formula. That is to say, each strip 23 in its disposition upon the surface of cylinder 2 is a solution of the equation. When $p_1 = 15$, for example, the first of the strips 23 is at every point in its extent a solution of the equation: the distance circumferentially of the cylinder from strip 22 to that particular strip 23 is at that particular point an expression of the value of W—the point itself, in its position longitudinally of the cylinder, being an expression of the value of $p_2$. Similarly, when $p_1 = 16$, the second of the strips 23 is at every point in its extent a solution of the equation. And it is entirely practical so to position each strip 23 of the set as to achieve the end in view.

Accordingly, with each rotation of cylinder 2 the tally 16 will operate during a greater or less fraction of the period of rotation, according to the value of the arc described by the block 4 relatively to cylinder 2 between its successive contacts, first with strip 22, and then with that one of strips 23 which at the time is (through a band 21) in electrical union with block 5, and the aggregate reading of the tally throughout protracted intervals of time is an indication of, and may indeed be an actual statement of, the work done by the compressor during such intervals.

Hitherto it has been necessary to make periodic readings of the values of $p_1$ and $p_2$; then, by solving the equation, to get a corresponding periodic valuation of W; and, finally, to aggregate the values of W. My instrument, dispensing with the necessity of periodic reading and incidental calculation, affords the result directly.

As has already been intimated, the bands 21 may be so varied in breadth and multiplied in number as to afford the desired summation of value, within permissible practical margins.

The invention has been illustrated and explained in one particular embodiment: an instrument, namely, for aggregating the value of the work done by an air compressor through prolonged intervals of time. Its wider applicability may readily be understood. Wherever a variable is so to be aggregated, the variable being conditioned upon two variables; that is to say, wherever during prolonged intervals of time the solution of an equation which involves two variable quantities is to be summated, the invention may be employed. The two blocks may in their movements along their runways be made responsive to the value of the two variables, and the bands and the strips upon the cylinder may be so particularly proportioned and arranged that under every condition a rotation of the cylinder will effect a movement of the tally through a range which shall be an expression of a solution of the equation.

I claim as my invention:

1. In measuring apparatus the combination of a constantly rotating member, a second rotatable member mounted coaxially with the first, electro-magnetically controlled means borne by the constantly rotating member and adapted to engage the second, two members movable relatively to the constantly rotating member and severally responsive in their movement to the value of two variable quantities, the said constantly rotating member and the two movable members last named being provided with electrical contact-pieces so disposed and arranged that the said electromagnetically controlled means shall be effective during a greater or less fraction of a complete rotation of the constantly rotating member, according to the instant value of such variables.

2. In measuring apparatus a rotatable member provided with electrical contact pieces disposed in two differently disposed surfaces of rotation, two members movable in parallelism one with each of such surfaces of rotation and equipped each with a contact piece adapted in the course of rotation of the rotatable member to engage a contact piece borne thereby, a second rotatable member mounted coaxially with the rotatable member first named, electro-magnetic means for uniting the two said rotatable members for integral rotation, said electro-magnetic means including the aforesaid contact pieces.

3. In measuring apparatus a rotatable member provided with electrical contact pieces disposed in two differently disposed surfaces of rotation, the contact pieces in one of such surfaces including a series of bands extending in the direction of rotation, and a contact piece in the other such surface of rotation including a plurality of strips extending obliquely to the direction of rotation, two members movable severally in parallelism with such surfaces of rotation and equipped each with a contact piece, a second movable member and means for causing said second member to move during a greater or less portion of a rotation of the rotatable member first named, according to the positions of the two said members which move in parallelism with the surfaces of revolution defined.

4. In measuring apparatus a rotatable cylinder bearing insulated upon one face a series of circumferentially extending bands of electrically conducting material, and bearing insulated upon the opposite face a group of contact pieces including one longitudinally extending strip and a plurality of obliquely extending strips, each of said obliquely extending strips being electrically united with one of the bands upon the opposite face of the cylinder, the band being disposed in one cylindrical surface and the strips being disposed in a cylindrical surface of different radius, two blocks movable severally along ways arranged parallel with and on opposite sides of said cylinder and equipped with contact pieces severally disposed in the two said cylindrical surfaces, a second movable member, and means for causing the said second movable member to move in synchronism with the cylinder during a greater or less portion of its rotation, according to the positions of the two said blocks along their ways.

5. In measuring apparatus, the combination of a constantly moving member, a second movable member, means for uniting the two said members at regularly recurrent intervals in the course of movement of the member first named, two control members movable severally in response to the values of two variable quantities, and means subject to said control members and operating in sequence upon said uniting means for effecting separation of the two members first named, the interval at which the operation of the said separation-effecting means succeeds that of the said uniting means being greater or less, according to the instant values of such variables.

In testimony whereof I have hereunto set my hand.

ARCHER E. YOUNG.